Patented Aug. 28, 1928.

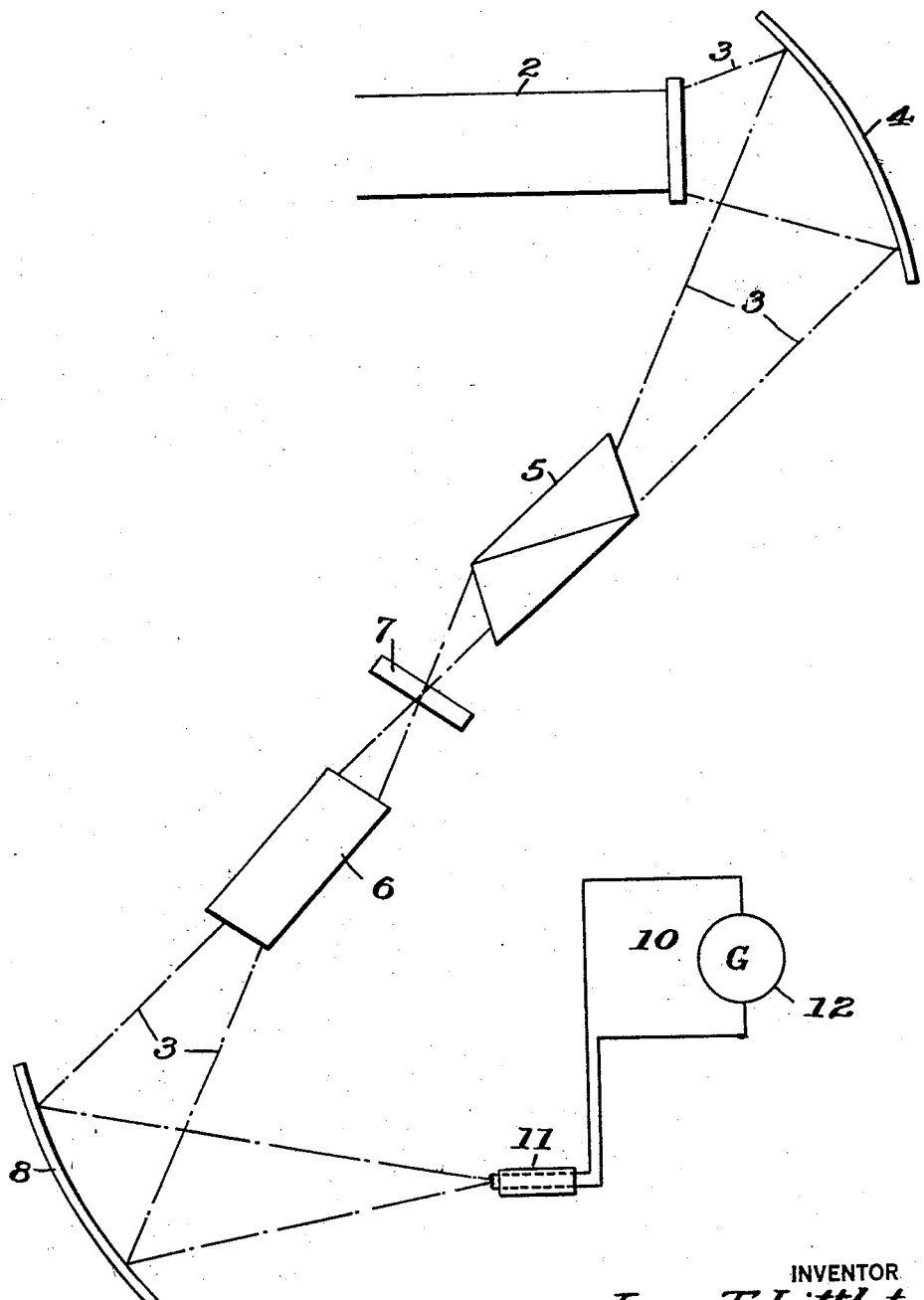

1,681,991

UNITED STATES PATENT OFFICE.

JESSE T. LITTLETON, JR., OF CORNING, NEW YORK, ASSIGNOR TO CORNING GLASS WORKS, OF CORNING, NEW YORK, A CORPORATION OF NEW YORK.

METHOD OF DETECTING AND MEASURING STRAINS.

Application filed November 20, 1926. Serial No. 149,747.

This invention relates to the art of strain detection and mesuration, and more particularly to a method of detecting and measuring strains in glass.

It has been a source of considerable difficulty in the glass industry to devise an accurate and generally applicable method of detecting and measuring strain set up in the glass during the manufacturing operation. As regards clear or substantially transparent glasses the method now usually availed of is to examine the same for strain by means of polarized visible light. This method is based upon the fact that strain in the transmitting medium has a depolarizing effect upon polarized light, and by suitable application of the ordinary polariscope a means of detecting strain in such glasses has been developed. The detection procedure is of the usual nature in polariscope operation, comprising first, setting the analyzer of the polariscope in extinction or darkening position as regards the polarizer, and then, visually noting any subsequent lighting up of the field upon the insertion of a clear glass specimen between the analyzer and the polarizer. Such a lighting up, or overcoming of the extinction effect of the crossed analyzer is occasioned by strain present in the glass specimen.

While substantially effective as applied to clear glasses such an arrangement is obviously inapplicable to glasses which do not transmit this polarized visible light. This is particularly true in the case of densely colored glasses, due to the insufficient amount of light transmitted even when using a light source of high intensity. It is even more ineffective as regards glasses made in colors to which the eye is not particularly sensitive, such as the red and blues. For opaque glasses, such as as the opals etc., there are no means at present available for determining the strain in such, and many objectionable developments result therefrom due to the inability to determine the amount of strain present in such glasses prior to their commercial distribution.

The object of my invention is to provide a method of detecting and measuring the strain present in opaque glasses and such colored glasses as do not readily transmit visible light.

My invention is based primarily upon the utilization of radiation having a heat effect, viz: "heat-rays" or "radiant heat", and preferably, although not necessarily, such rays as lie beyond the visible part of the spectrum in the region commonly referred to as the infra-red. For detecting the presence of such heat-rays I use any well-known heat-detector, comprising usually a heat-sensitive element, such as a black body, thermopile, etc., in conjunction with an indicating means for registering effects upon the heat-sensitive element. For detecting and measuring the intensity of such heat-rays I use any well known radiometer such as the bolometer, thermopile and galvanometer, etc. Such detecting and measuring instruments provide a very satisfactory means of coping with the problem of detecting and measuring strain in media of relative or absolute invisibility which render direct visual observations impossible.

With the above and other objects in view, I have described my invention in the following specification, taken in conjunction with the accompanying figure, which is a diagrammatic view of the arrangement of the apparatus used in carrying out my method.

Referring to the drawings, reference character 2 designates a source of heat-rays, in this instance infra-red radiation. For such source any suitable means may be utilized, provided that the radiation from such source is composed principally of infra-red rays. A cheap and suitable means is the common wire-wound resistance furnace at a temperature of about 450° centigrade, at which temperature the radiation therefrom is mainly composed of infra-red rays. The rays 3 emanating from the source 2 are directed upon a concave mirror 4 of suitable focal length and aperture to concentrate these rays upon the polarizer 5 of a polariscope of any ordinary type. The analyzer of said polariscope is designated by the reference character 6. Inserted between the polarizer 5 and the analyzer 6, which may for example be the usual Nicol prisms, is shown a specimen 7 of glass, the strain in which is to be measured. Located in suitable position in reference to the rays transmitted by the analyzer 6 is another concave mirror 8 of suitable focal length and aperture to redirect such rays and concentrate them upon the heat-sensitive element 11 of an instrument 10 which detects and measures heat-rays. In the arrangement shown the instrument 10 comprises a thermopile 11 connected in series with an ordinary galvanometer 12 of suitable sensitivity and period, although various other types of instrument falling within the category noted, such as the bolometer, thallophyte cell, etc. may be used.

The operation of the system in testing a glass specimen by my method is as follows:

The mirror 4 is first so located in reference to the source 2 of the infra-red rays i. e., the source of radiation, and the polarizer 5 as to concentrate the radiation upon the latter. The polarizer 5 and analyzer 6 are then balanced against each other i. e., set in 90° relationship, so that all light coming through the polarizer is blanketed by the analyzer, as is well known in the art, and commonly referred to as "crossed". The glass specimen 7 is then inserted between the polarizer and the analyzer, and any strain in the specimen will cause a change, probably from plane polarized light to some form of elliptical polarized light, ("depolarization" as it is usually designated), and the analyzer will then transmit certain components of that elliptical polarized light, the amount transmitted being proportional to the strain in the glass specimen, the orientation of the latter always being that which gives the maximum effect. Proceeding from the analyzer, the rays so transmitted will strike the mirror 8, which is located in such relation to the polariscope and the measuring instrument that such transmitted infra-red radiation will be concentrated on the heat-sensitive element 11. The deflection of the needle (not shown) in the galvanometer 12 of instrument 10 will then indicate a value for the particular strain, subject to such correction as may be necessary for the infra-red radiation absorbed by the glass specimen.

The procedure for determining such infra-red absorption is as follows:

First, set the polarizer and the analyzer parallel to each other and take a reading of the instrument scale upon passage of infra-red rays through this infra-red polariscope. Then insert the glass specimen between the polarizer and analyzer in this same relation, and note the reading on the instrument. From these two readings the correction necessary for the absorption of infra-red by the specimen will be determined. The steps subsequent to this operation should then be followed as hereinbefore noted, and upon application of the proper absorption correction to the final reading obtained, a true value for the amount of strain present in the glass specimen will be obtained.

The method which I have just described provides a suitable and substantially accurate manner of determining an index for the strain present in various glasses, particularly in those where the application of detection by visible light transmission is impractical or impossible. By my method both the presence and amount of strain in opaque glasses, and in such colored glasses as are too slightly transparent to visible light, or present other difficulties to the detection of strain by its use, may now be determined, with a resultant safeguarding against a commercial distribution of glasses whose structures may be inherently but, heretofore, undetectably defective. It is obvious that this method can also be applied with advantage to clear and readily transparent glasses.

The specific nature and arrangement of parts which I have herein shown and described are intended merely to be illustrative, and various equivalent substitutions or arrangements may be made. My invention contemplates the application of other well-known sources of heat-rays, manners of directing the rays upon the polariscope and radiometer, and types of instruments for measuring the intensity of the heat-rays. I do not limit myself to the particular means hereinbefore set forth, but consider my invention to cover all such equivalents and modifications as may fall within the scope of the following claims.

I claim:

1. A method of detecting strain in a medium transmissive of heat-rays, which comprises the steps of polarizing heat-rays, passing said polarized heat-rays through a transmissive specimen, absorbing the polarized rays transmitted by said specimen, and noting the presence or absence of strain in said specimen in terms of the effect produced upon a heat detector by the depolarized rays transmitted by said specimen.

2. A method of measuring strain in a medium transmissive of heat-rays, which comprises the steps of polarizing heat-rays, passing said polarized heat-rays through a transmissive specimen, absorbing the polarized rays transmitted by said specimen, and measuring strain present in said specimen in terms of the effect produced upon a radiometer by the depolarized rays transmitted by said specimen.

3. A method of detecting strain in a medium transmissive of heat-rays, which consists in conducting heat-rays into a polarizing medium, blanketing transmission of the polarized rays to a heat detector by means of a second polarizing medium crossed on the first, placing a transmissive specimen in the path of the polarized rays, and noting the presence or absence of strain in said specimen by the effect upon the heat detector.

4. The method of measuring strain in glass, which consists in directing polarized infrared rays through a polariscope, and reading the deflection of a radiometer on which rays transmitted by said polariscope are concentrated, repeating the operation with the exception that the rays are also passed through a specimen of glass to be tested and the polariscope is set for extinction of the rays, and reading the difference in the deflection of the radiomter in the two cases.

JESSE T. LITTLETON, Jr.